United States Patent [19]

Noguchi

[11] Patent Number: 5,762,371
[45] Date of Patent: Jun. 9, 1998

[54] SHOULDER BELT ANCHOR ADJUSTING DEVICE FOR SEAT BELT

[75] Inventor: Shoichi Noguchi, Ibaraki-ken, Japan

[73] Assignee: Sanoh Kogyo Kabushiki Kaisha, Tokyo, Japan

[21] Appl. No.: 628,313

[22] Filed: Apr. 4, 1996

[30] Foreign Application Priority Data

Nov. 21, 1995 [JP] Japan ................... 7-303078

[51] Int. Cl.$^6$ .................. B60R 22/20; B60R 22/24
[52] U.S. Cl. ............... 280/801.2; 280/808; 297/483; 403/328; 411/522
[58] Field of Search ................ 280/801.2, 808, 280/801.1; 297/483, 485, 468; 403/328; 411/522, 352

[56] References Cited

U.S. PATENT DOCUMENTS 4,536,011  8/1985  Ono .................... 280/801.2

FOREIGN PATENT DOCUMENTS

| | | | |
|---|---|---|---|
| 472995 | 12/1914 | France | 403/328 |
| 2440204 | 5/1980 | France | 280/801.1 |
| 2442639 | 6/1980 | France | 280/808 |
| 27 43 209 | 4/1979 | Germany | 280/801.1 |
| 1-94156 | 6/1989 | Japan | |

Primary Examiner—Peter C. English
Attorney, Agent, or Firm—Ladas & Parry

[57] ABSTRACT

A shoulder belt anchor adjusting device comprises an adjusting unit supported on a side pillar of a vehicle so as to be movable in substantially vertical directions along the side pillar, and having a stud bolt as a shoulder belt anchor support projection projecting toward the interior of the cabin of the vehicle; and a shoulder belt anchor unit detachably mounted on the stud bolt of the adjusting unit, and having an anchor member through which a seat belt is passed. The stud bolt is provided with an engagement groove in its head portion, the shoulder belt anchor unit is provided with a latch member or members which engage with the engagement groove in a spring action to hold the shoulder belt anchor unit on the adjusting unit, when the shoulder belt anchor unit is moved toward the adjusting unit along the axis of the stud bolt. It is not necessary to remove a cover of the shoulder belt anchor unit before the anchor unit is assembled with the adjusting unit.

10 Claims, 11 Drawing Sheets

SHOULDER BELT ANCHOR ADJUSTING DEVICE FOR SEAT BELT

BACKGROUND OF THE INVENTION

1. Field of the Invention

The present invention relates to a shoulder belt anchor adjusting device for a seat belt designed to hold a person steady in a seat on a vehicle, such as an automobile.

2. Description of the Related Art

A seat belt of a three-point suspension system for a vehicle is suspended at one point on a shoulder belt anchor attached to the inner surface of a side pillar of the vehicle. The height of the shoulder belt anchor is adjustable according to the sitting height or the like of a person seated in the seat. The height of the shoulder belt anchor is adjusted by a shoulder belt anchor adjusting device, such as disclosed in JP-U-1-94156(A).

A well-known shoulder belt anchor adjusting device comprises an adjusting unit mounted on a side pillar of a vehicle so that its vertical position is adjustable, and a shoulder belt anchor unit detachably attached to the adjusting unit and provided with an anchor through which a seat belt is passed. The shoulder belt anchor unit of this well-known shoulder belt anchor adjusting device is detachably joined to the adjusting unit with a bolt, which is passed through the shoulder belt anchor unit and screwed into a nut fixed to the adjusting unit.

When mounting the well-known shoulder belt anchor adjusting device on a vehicle on a vehicle assembly line, first the adjusting unit is attached to a side pillar of the vehicle, and then the shoulder belt anchor unit is joined to the adjusting unit with the bolt. The work for joining the shoulder belt anchor to the adjusting unit with the bolt requires work for screwing the bolt into the nut, which takes comparatively much time. Furthermore, since the hole of the shoulder belt anchor unit for receiving the bolt therethrough must be exposed to pass the bolt through the shoulder belt anchor unit, a cover for covering the shoulder belt anchor unit must be removed before passing the bolt through the shoulder belt anchor unit, and the cover needs to be put on the shoulder belt anchor unit after joining the shoulder belt anchor unit to the adjusting unit. Such a series of steps of work for joining the shoulder belt anchor unit to the adjusting unit are undesirable from the view point of reducing assembling time.

SUMMARY OF THE INVENTION

The present invention has been made to solve such problems and it is therefore an object of the present invention to provide a shoulder belt anchor adjusting device comprising an adjusting unit, and a shoulder belt anchor unit capable of being joined to the adjusting unit by a single snap-together action with a cover put thereon.

According to the present invention, a shoulder belt anchor adjusting device for a seat belt comprises an adjusting unit attached to a side pillar of a vehicle so as to be vertically movable for positional adjustment and having a shoulder belt anchor support projection projecting into the cabin of the vehicle, and a shoulder belt anchor unit detachably mounted on the shoulder belt anchor support projection of the adjusting unit and provided with an anchor through which the seat belt is passed. The shoulder belt anchor support projection of the adjusting unit is provided with a first engagement means, the shoulder belt anchor unit is provided with a second engagement means which snaps to the adjusting unit at the first engagement means when the shoulder belt anchor unit is moved along the axis of the shoulder belt anchor support projection.

The shoulder belt anchor unit, assembled and provided with a cover in a workshop separate from the vehicle assembling line, can be joined to the adjusting unit in an instant by pressing the shoulder belt anchor unit along the axis of the projection toward the adjusting unit mounted on a vehicle. Therefore, the cover need not be removed from the shoulder belt anchor unit for joining the shoulder belt anchor unit to the adjusting unit on the vehicle assembling line. Accordingly, faulty mounting of the cover on the shoulder belt anchor unit, which is liable to occur when the cover is put on the shoulder belt anchor after joining the shoulder belt anchor to the adjusting unit, will not occur, and time necessary for assembling the shoulder belt anchor adjusting device can be greatly reduced.

According to the present invention, the first engagement means of the shoulder belt anchor support projection of the adjusting unit may be an engagement groove formed in the circumference of the shoulder belt anchor support projection, the second engagement means of the shoulder belt anchor unit may be a latch mechanism having a latch member or members elastically biased in a closing direction and capable of elastically engaging with the engagement groove of the shoulder belt anchor support projection, and the shoulder belt anchor support projection may be provided at its extremity with a cam surface that moves the latch member or members in an opening direction or directions against resilience biasing the latch members in the closing direction or directions when the shoulder belt anchor unit is moved along the axis of the shoulder belt anchor support projection toward the adjusting unit. The shoulder belt anchor unit may be internally provided with a guide device for guiding the latch mechanism, and at least the surface of the guide device may be formed of a cushioning material, which prevents the latch mechanism from being rattled by vibrations generated by the vehicle.

The above and other objects, features and advantages of the present invention will become more apparent from the following description taken in connection with the accompanying drawings.

DETAILED DESCRIPTION OF THE PREFERRED EMBODIMENTS

Figure 1:
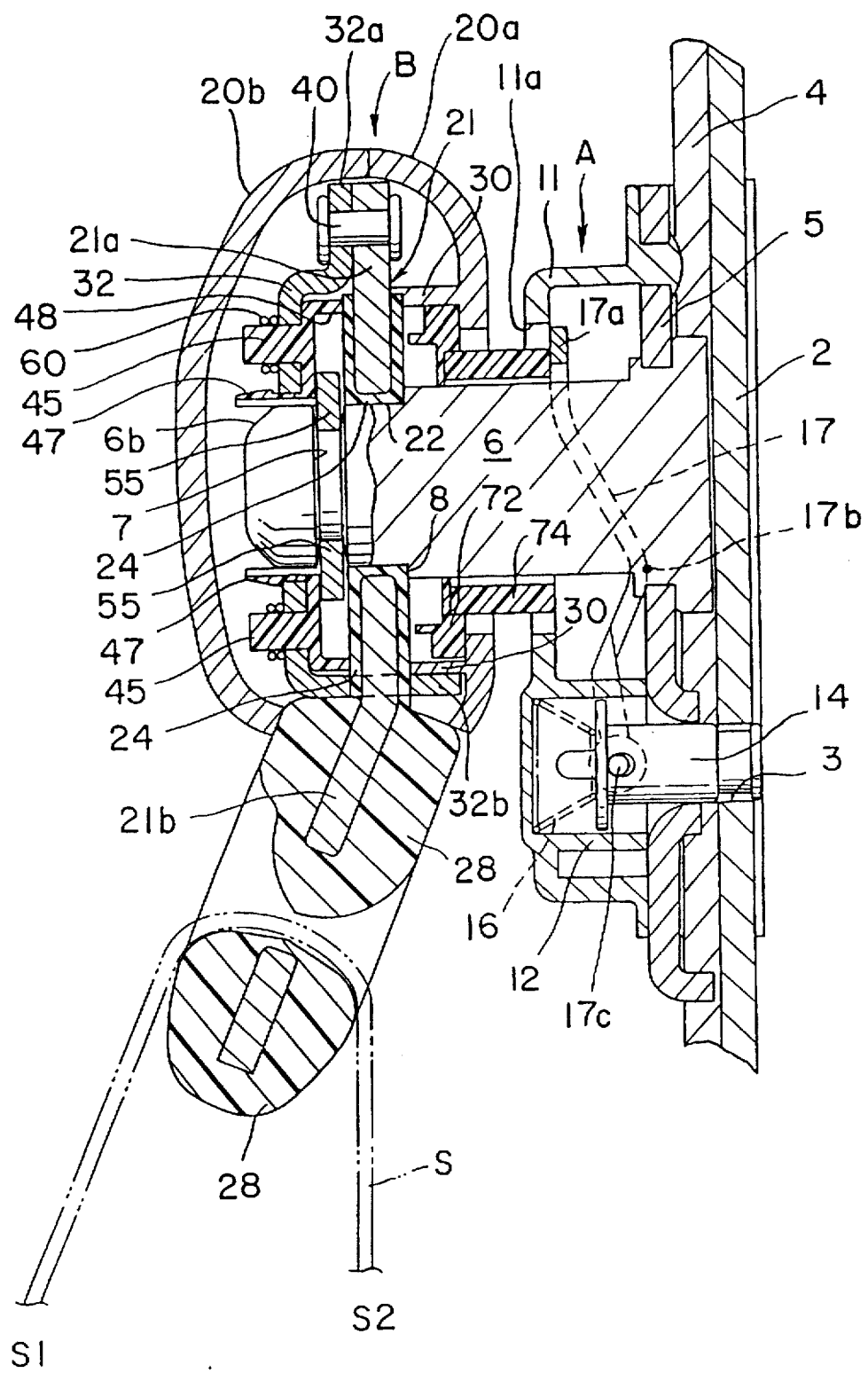
FIG. 1 is a longitudinal sectional view of a shoulder belt anchor adjusting device according to a first embodiment of the present invention as mounted on a vehicle.
Figure 2:
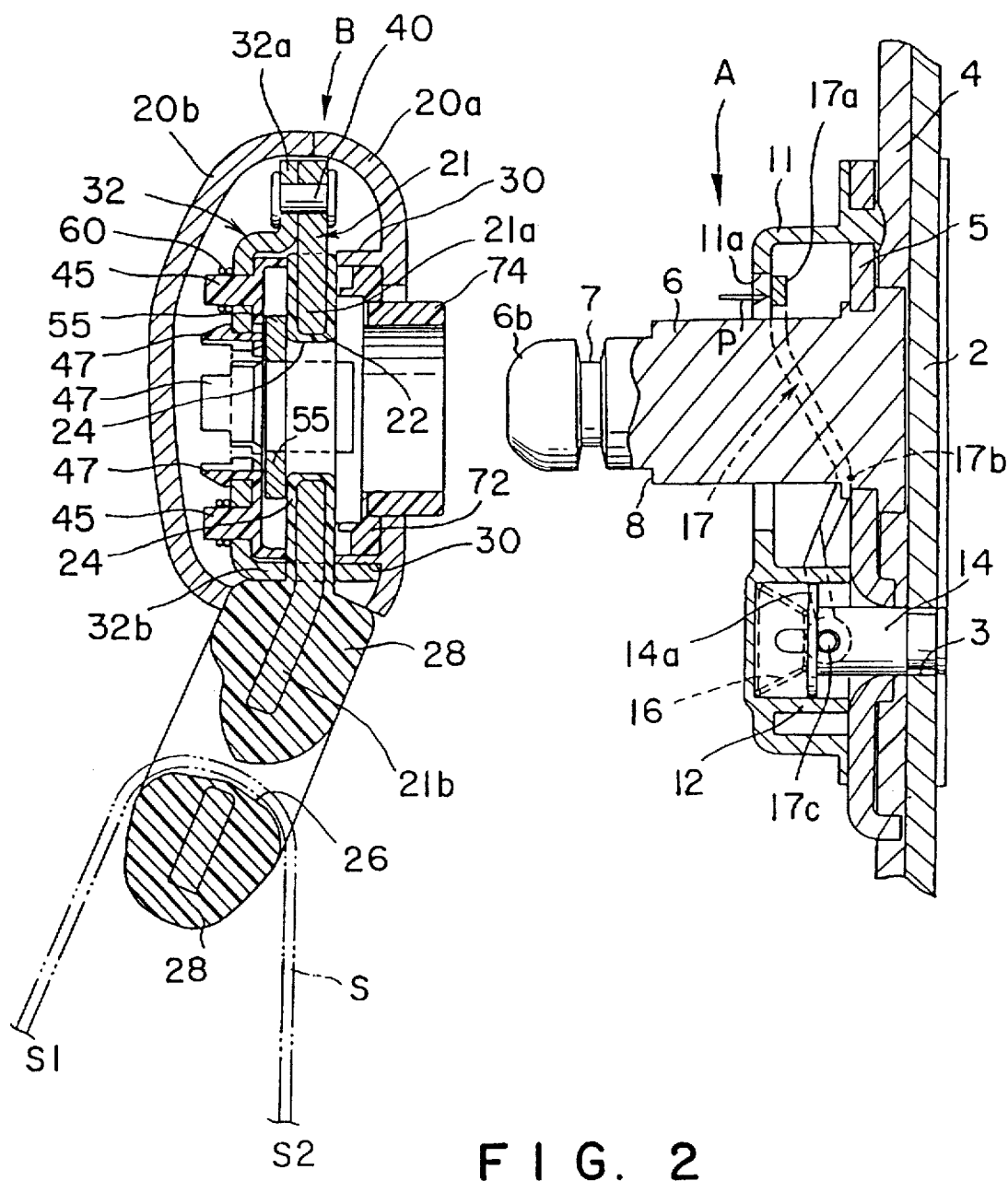
FIG. 2 is a longitudinal sectional view of the shoulder belt anchor adjusting device of FIG. 1 in a disassembled state.

As shown in FIGS. 1 and 2, a shoulder belt anchor adjusting device according to a first embodiment of the present invention comprises, as principal components, an adjusting unit A and a shoulder belt anchor unit B.

Referring to FIGS. 1 and 2, the adjusting unit A has a vertically elongate guide member 2 fixed on, for example, a side pillar of an automobile, and provided with a plurality of holes 3 (only one of the holes 3 is shown) vertical arranged at intervals. A slide plate 4 is vertically slidably supported on the inner surface, i.e., the left surface in FIG. 1 facing the passenger compartment or cabin, of the guide member 2. A stud bolt 6, i.e., a support member for supporting the shoulder belt anchor unit B, is attached to the slide plate 4 so as to project into the cabin from the inner surface of the slide plate 4. Although the embodiment shown in FIG. 1 employs the stud bolt 6 as shown in FIG. 1 as a support member, any suitable member having an elongated shape other than that of the stud bolt 6 may be employed as the support member. A fastening plate 5 attached to the base end of the stud bolt 6 is fixed to the slide plate 4 by a suitable fixing means.

Figure 3:
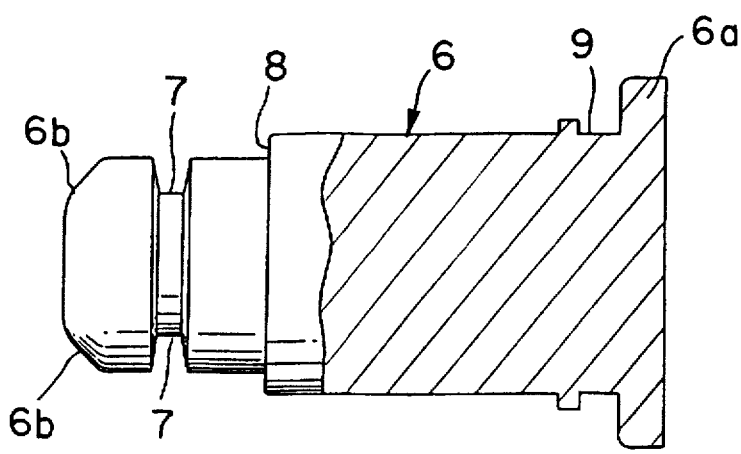
FIG. 3 is a partly broken side view of a stud bolt (shoulder belt anchor support projection) employed in the shoulder belt anchor adjusting device of FIG. 1.
Figure 4:
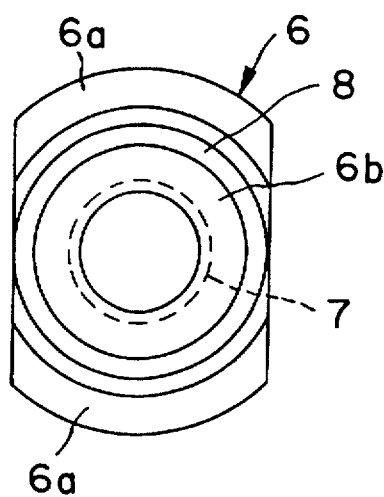
FIG. 4 is an end view of the stud bolt of FIG. 3.
Figure 5:
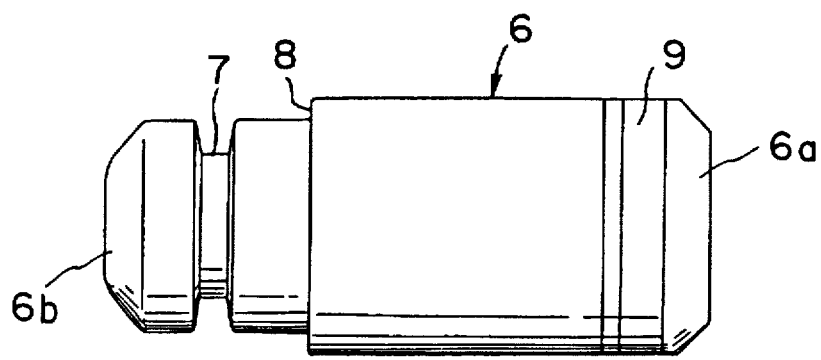
FIG. 5 is a bottom view of the stud bolt of FIG. 3.

Referring to FIGS. 3, 4 and 5, basically, the stud bolt 6 has a generally cylindrical shape, and is provided at its base end with a flange 6a having opposite flat faces and on its head end with a cam surface 6b tapered toward the extremity of the head end. An engagement groove 7 as a first engagement means is formed behind the cam surface 6b in the head portion of the stud bolt 6. In the embodiment shown in FIG. 1, the engagement groove 7 is a circumferential circular groove. A portion of the stud bolt 6 extending behind the engagement groove 7 is radially expanded to form a shoulder 8. Indicated at 9 is a groove for receiving the fastening plate 5.

Referring to FIG. 2, a frame 11 is joined fixedly to the inner surface, i.e., a surface facing the cabin, of the fastening plate 5 of the adjusting unit A. A cylindrical pin guide part 12 having an axis perpendicular to the fastening plate 5 is formed in a portion of the frame 11 to receive a pin 14 slidably therein. The pin 14 is provided with a flange 14a having a diameter corresponding to the inner diameter of the pin guide part 12. The pin 14 is biased to the right, as viewed in FIG. 2, by a spring 16. Normally, the pin 14 is fitted in one of the plurality of holes 3 formed in the guide member 2.

A release lever 17 for lifting the pin 14 is disposed inside the frame 11. The release lever 17 is formed generally in a shape resembling an inverted letter U as viewed from the left in FIG. 2. The release lever 17 has an operating end 17a, i.e., an end corresponding to a bottom portion of the letter U, a working end connected to the pin 14 with a pin 17c, and a middle portion pivotally supported at 17b on a support, not shown. The operating end 17a of the release lever 17 is located near an opening 11a formed in the central portion of the frame 11 and having a diameter large enough to pass the stud bolt 6 therethrough. When a force acting in the direction of the arrow P is applied to the operating end 17a of the release lever 17, the release lever 17 turns clockwise around the pivot 17b and the pin 14 connected to the release lever 17 through the pin 17c is moved to the left as viewed in FIG. 2 out of the hole 3 against the resilience of the spring 16; consequently, the slide plate 4 holding the stud bolt 6 is released from the guide member 2 and is able to be moved vertically relative to the guide member 2 for positional adjustment. When the force acting in the direction of the arrow P is removed from the operating end 17a of the release lever 17, the pin 14 is inserted in the hole 3 by the resilience of the spring 16 to prevent vertical movement of the slide plate 4 holding the stud bolt 6 relative to the guide member 2. The principle of the operation for operating the pin 14 is generally known in the art and hence further description thereof will be omitted.

Figure 6:
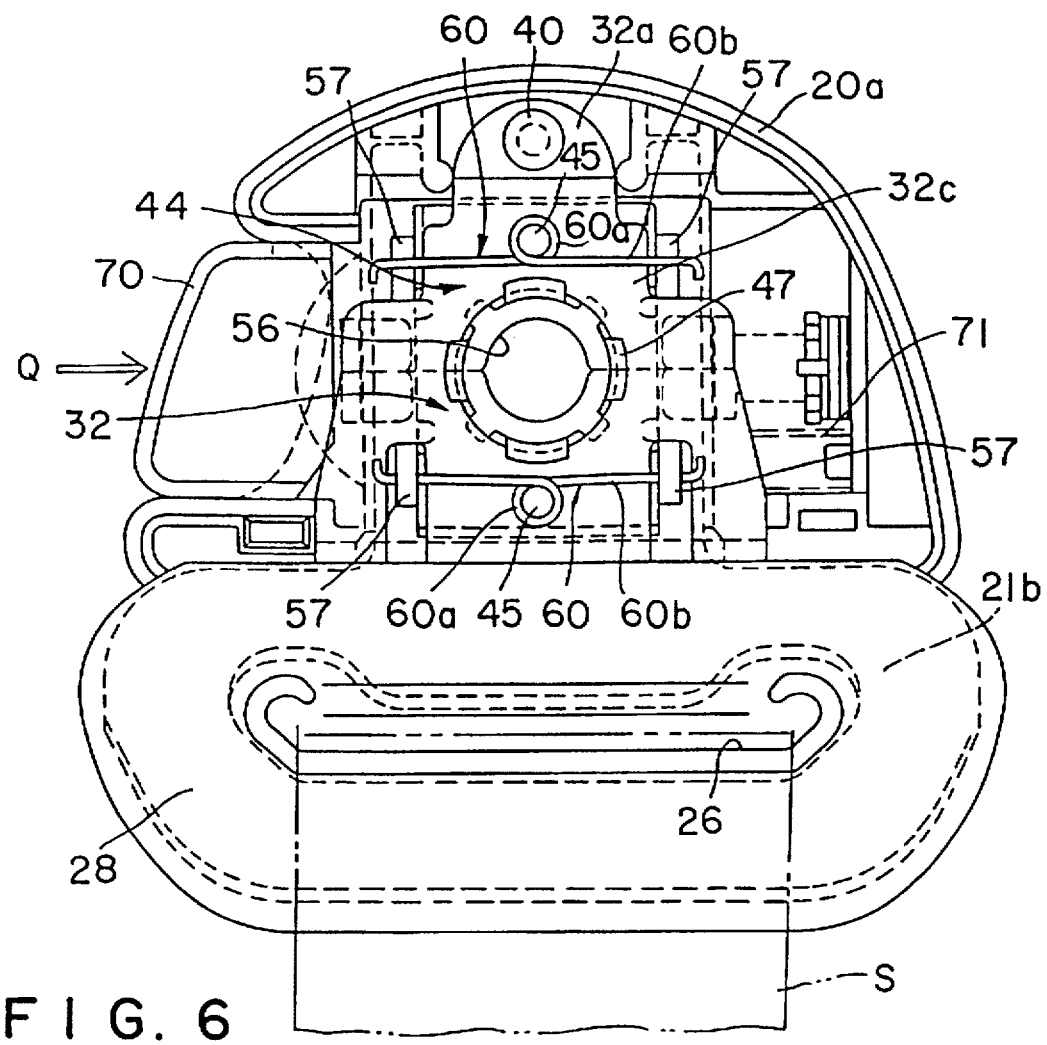
FIG. 6 is a front view of the shoulder belt anchor adjusting device of FIG. 1 as viewed from the left in FIG. 1.

The shoulder belt anchor unit B will be described below. The shoulder belt anchor unit B is detachably put on the stud bolt 6 so as to cover the adjusting unit A. The shoulder belt anchor unit B has a back cover 20a and a front cover 20b, which are united to form an enclosing shell. A guide anchor 21 formed of a metal is inserted in the space defined by the covers 20a and 20b through an opening formed in the lower portion of the enclosing shell. The guide anchor 21 has an inner anchor part 21a and an outer anchor part 21b. The inner anchor part 21a is placed in the space defined by the covers 20a and 20b, and provided in its central portion with an opening 22. The outer surface of the inner anchor part 21a including the side surface of the opening 22 is coated entirely with a coating layer 24 of a cushioning material, such as a synthetic resin, e.g., a polyacetal resin. The outer anchor part 21b extends downward to the outside of the covers 20a and 20b, and is provided with a slot 26 for passing therethrough a seat belt S, as best shown in FIG. 6. The outer anchor part 21b is coated with a coating layer 28 of the same cushioning material as that forming the coating layer 24, by molding. One end S1 (FIG. 2) of the seat belt S is connected to a buckle to be operated by a person seated in the seat, and the other end S2 (FIG. 2) of the same is connected to a well-known retractor.

Figure 8:
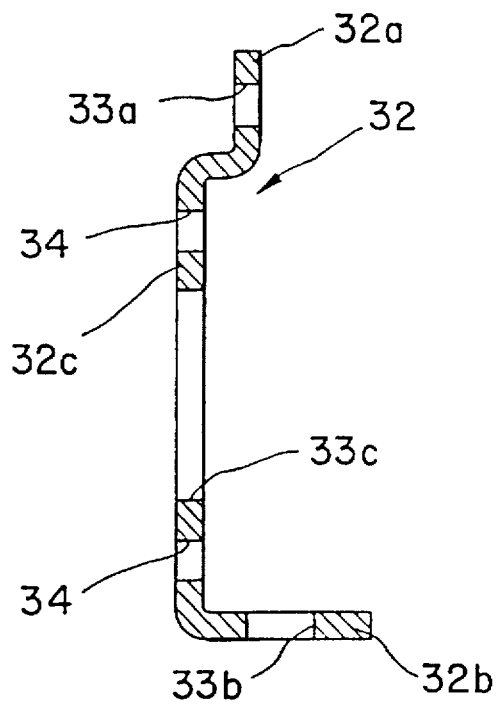
FIG. 8 is a sectional side view of a holder employed in the shoulder belt anchor adjusting device of FIG. 1.
Figure 9:
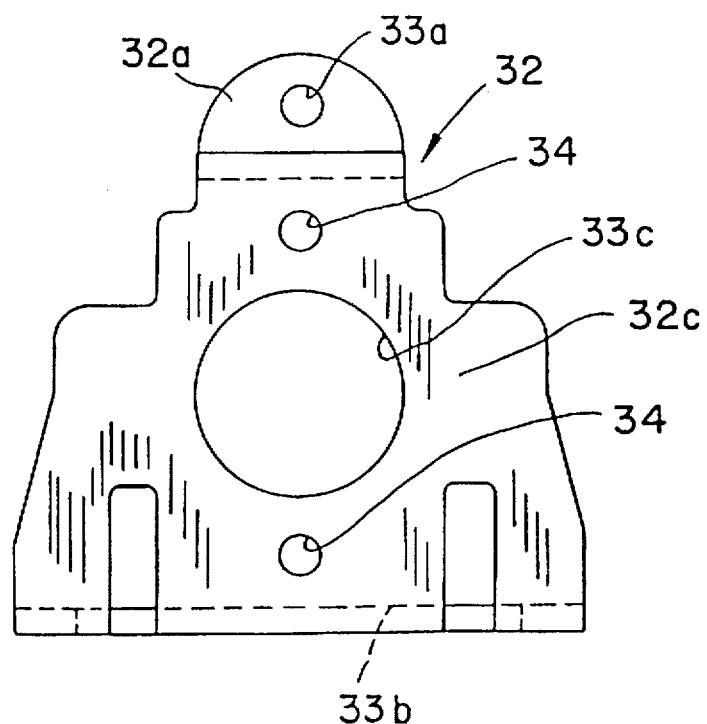
FIG. 9 is a front view as viewed from the left in FIG. 8.

A support projection 30 projects from the inner surface of the back cover 20a, and the inner anchor part 21a rests on the support projection 30 with its back surface in contact therewith. A holder 32 is held on the front surface (the left surface as viewed in FIG. 2) of the inner anchor part 21a. As best shown in FIGS. 8 and 9, the holder 32 is an integral piece and includes an L-shaped upper part 32a offset to the back, an L-shaped lower part 32b formed by bending a lower portion to the back, and a flat main part 32c. The upper part 32a, the lower part 32b and the main part 32c are provided with a through hole 33a, a through hole 33b and a large central through hole 33c, respectively. A pair of small holes 34 are formed above and below the central through hole 33c in the flat main part 32c. As shown in FIGS. 1 and 2, the upper part 32a of the holder 32 is attached to an upper portion of the inner anchor part 21a with a rivet 40 inserted in the through hole 33a. The flat main part 32c of the holder 32 extends down along the inner anchor part 21a, and the L-shaped lower part 32b extends along the support projection 30.

Figure 10:
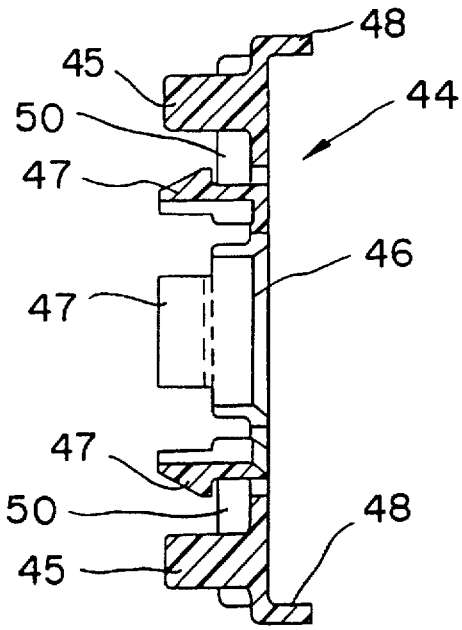
FIG. 10 is a sectional view of a cushioning member employed in the shoulder belt anchor adjusting device of FIG. 1.
Figure 11:
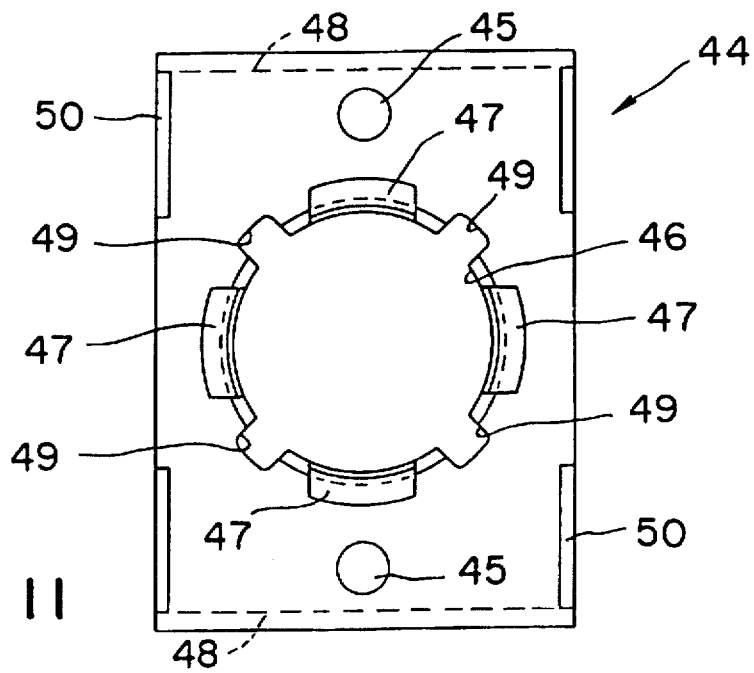
FIG. 11 is a front view of the cushioning member of FIG. 10 as viewed from the left in FIG. 10.
Figure 12:
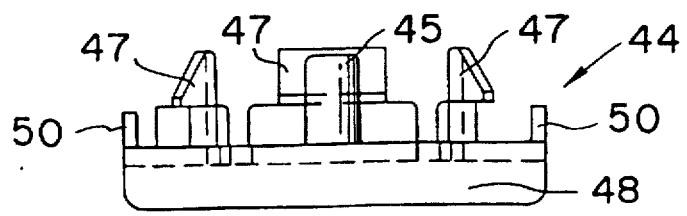
FIG. 12 is a bottom view of the cushioning member of FIG. 10 as viewed from below in FIG. 11.

A plurality of members, which will be described below, are installed in a space between the inner anchor part 21a of the guide anchor 21 and the flat main part 32c of the holder 32. A cushioning member 44 shown in FIGS. 10, 11 and 12 is one of those members. The cushioning member 44 is formed of a cushioning material such as a synthetic resin, e.g., a polyacetal resin, in a generally flat plate. The cushioning member 44 is integrally provided with a pair of cylindrical projections 45 on its front surface. A substantially circular through hole 46 is formed in the central portion of the cushioning member 44. The cushioning member 44 is provided on its front surface with curved protrusions 47 each having the shape of a circular arc and an enlarged head of a triangular cross section and arranged at equal angular intervals along the edge of the circular through hole 46 and rising from the surface thereof. Recesses 49 (FIG. 11) are formed at equal angular intervals in the edge of the circular through hole 46. The cushioning member 44 is provided with ribs 50 formed along the side edges and near the corners of the cushioning member 44 on the front surface, and flanges 48 serving as spacers along the opposite end edges, respectively, on the back surface.

As shown in FIGS. 1 and 2, the cushioning member 44 is fitted in the space between the inner anchor part 21a and the flat main part 32c of the holder 32 with the through hole 46 of the cushioning member 44 coaxial with the central through hole 33c of the holder 32. The cushioning member 44 is assembled with the holder 32 by passing the curved protrusions 47 through the central through hole 33c of the holder 32 from the back surface of the holder 32, elastically deforming the enlarged heads, and inserting the pair of cylindrical projections 45 into the pair of small holes 34 of the holder, respectively. Thus, the cushioning member 44 is held fixedly on the back surface of the holder 32. The width of the flanges 48 of the cushioning member 44 corresponds to the thickness of the space between the inner anchor part 21a and the flat main part 32c of the holder 32. The flanges 48 prevent separation of the cushioning member 44 from the back surface of the holder 32.

Figure 13:
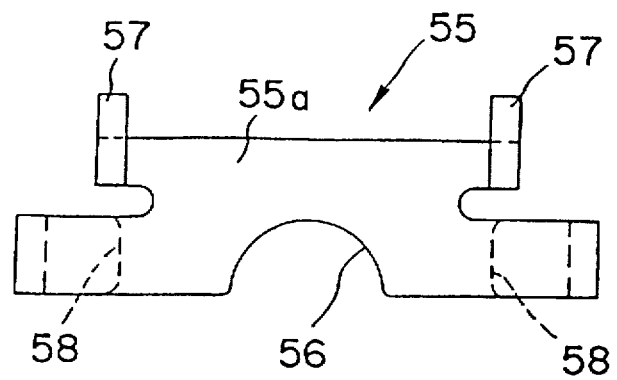
FIG. 13 is a front view of one of a pair of latch members employed in the shoulder belt anchor adjusting device of FIG. 1.
Figure 14:
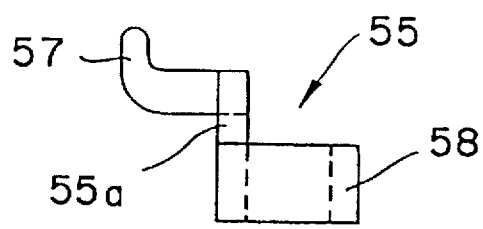
FIG. 14 is a side view of the latch member of FIG. 13 as viewed from the right in FIG. 13.
Figure 15:
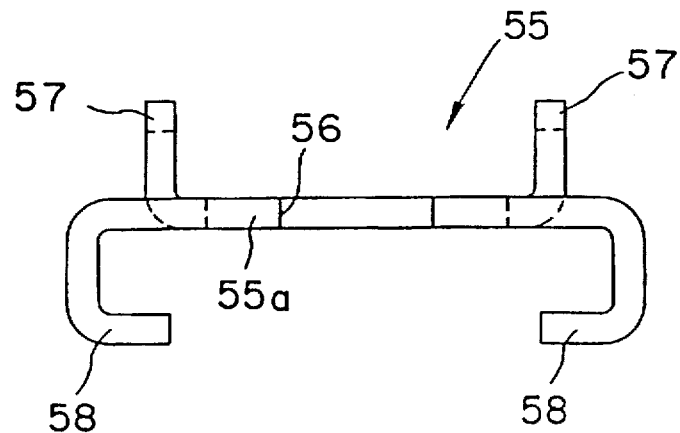
FIG. 15 is a bottom view of the latch member of FIG. 13.
Figure 16:
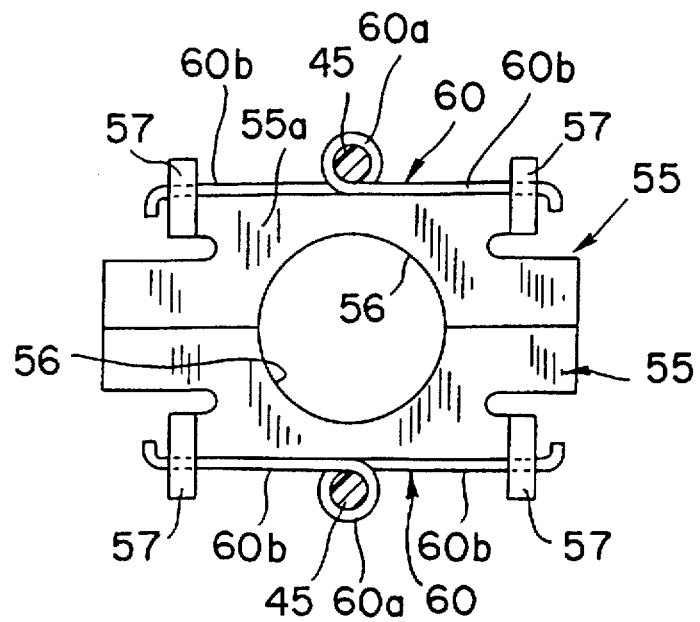
FIG. 16 is a front view of the pair of latch members in a closed state.

As shown in FIGS. 1 and 2, a pair of latch members 55, i.e., upper and a lower latch members, are inserted in the space between the cushioning member 44 and the inner anchor part 21a. The latch members 55 are symmetrical with respect to a horizontal line. As shown in FIGS. 13, 14 and 15, the upper latch member 55, for example, has a flat body part 55a of a metal provided in its contact edge, i.e., lower edge, with a semicircular recess 56, hook-shaped projections 57 protruding to the front from the opposite side ends of the upper edge of the body part 55a, and U-shaped projections 58 protruding to the back from the opposite side ends of the contact edge of the body part 55a. The pair of latch members 55 are disposed in combination as shown in FIGS. 6 and 16. When the pair of latch members 55 are thus combined, the semicircular recesses 56 form a circular opening coaxial with the stud bolt 6, and the contact edges are in contact with each other. Torsion coil springs 60 are engaged with the latch members 55, respectively. Each torsion coil spring has a central coil 60a wound around the cylindrical projection 45 of the cushioning member 44, and a pair of arms 60b extending in opposite directions from the central coil 60a and resting on the hook-shaped projections 57 of the latch member 55, respectively. The torsion coil springs 60 bias the corresponding latch members 55 toward each other so that the contact edges of the pair of latch members 55 are in contact with each other as shown in FIG. 16. The latch members 55 constitute the second engagement means.

The pair of latch members 55 are fitted in the space between the back surface of the cushioning member 44 and the coating layer 24 formed over the surface of the inner anchor part 21a and guided for movement in the space in a manner which will be described later. The cushioning member 44 and the coating layer 24 formed over the surface of the anchor part 21a constitute a guide device for guiding the latch members 55. Since these members are formed of cushioning materials, the latch members 55 will not rattle even if the same are shook by vibrations generated by the vehicle.

Referring to FIG. 6, a push button 70 is supported on the back cover 20a for sliding movement in the direction of the arrow Q and biased in a direction opposite to the direction of the arrow Q by a spring 71. The push button 70 is manually pushed against the resilience of the spring 71. As is generally known, a sliding part 72 of the push button 70 is disposed so as to be movable perpendicularly to the sheet of FIG. 1 within the space defined by the back cover 20a as shown in FIGS. 1 and 2. The sliding part 72 slides in the direction of the arrow Q when the push button 70 is pushed in the direction of the arrow Q. A ring 74 is fitted in an opening formed in the back wall of the back cover 20a so as to receive the stud bolt 6 therein and to be axially movable, i.e., movable in horizontal directions as viewed in FIGS. 1 and 2. When the sliding part 72 is caused to slide in the direction of the arrow Q by pushing the push button 70, a cam surface, not shown, formed in the sliding part 72 displaces the ring 74 to the right, as viewed in FIGS. 1 and 2. When the shoulder belt anchor adjusting device is assembled as shown in FIG. 1, the ring 74 is in contact with the operating end 17a of the release lever 17. When the push button 70 is pushed to slide the sliding part 72 in the direction of the arrow Q, the ring 74 depresses the operating end 17a of the release lever 17 in the direction of the arrow P shown in FIG. 2.

The functions of the shoulder belt anchor adjusting device thus constructed will be described below.

When the shoulder belt anchor adjusting device is assembled as shown in FIG. 1 and the push button 70 is pushed in the direction of the arrow Q, the ring 74 pushes the operating end 17a of the release lever 17. Consequently, the release lever 17 is turned clockwise as viewed in FIG. 1, and the pin 14 connected to the working end of the release lever 17 is moved to the left, as viewed in FIG. 1, out of the hole 3 to enable the slide plate 4 to slide relative to the guide member 2. Then, the slide plate 4 can be moved vertically to adjust the height of the stud bolt 6, i.e., the height of the shoulder belt anchor unit B. When the pressure applied to the push button 70 is removed after setting the shoulder belt anchor unit B at a desired height, the pin 14 is fitted in the hole 3 corresponding to the height of the shoulder belt anchor unit B to hold the anchor unit B at the desired height.

Figure 7:
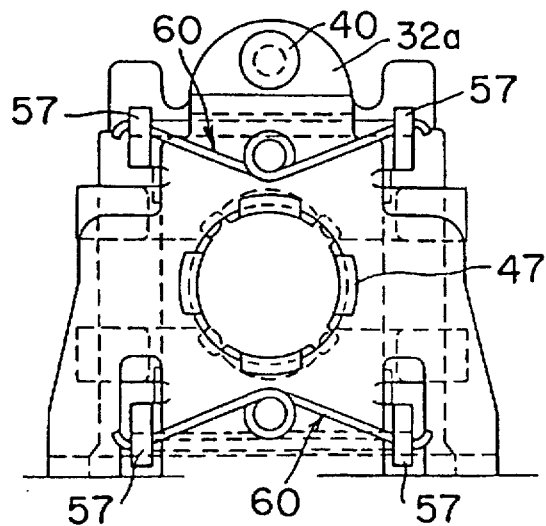
FIG. 7 is a front view showing a portion of the shoulder belt anchor adjusting device of FIG. 1 in a state different from a state of the same shown in FIG. 6.
Figure 17:
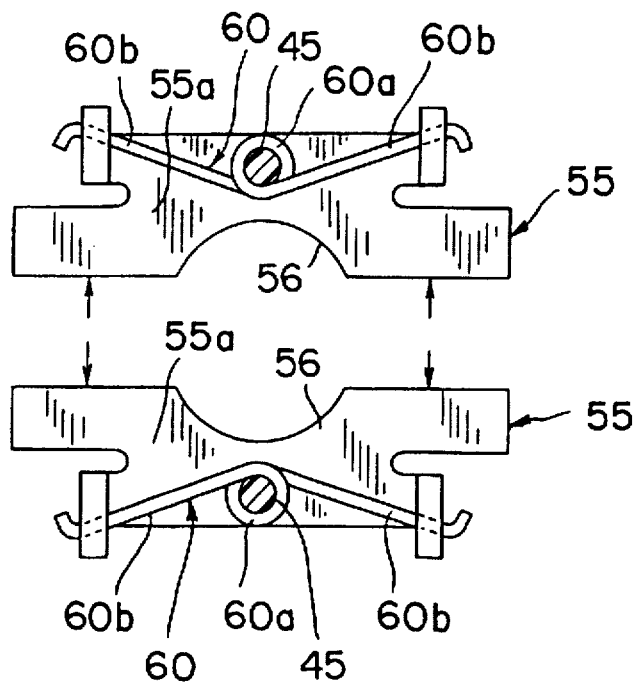
FIG. 17 is a front view of the pair of latch members in an open state.

When mounting the shoulder belt anchor adjusting device on a vehicle on the vehicle assembly line, the adjusting unit A, which is not assembled with the shoulder belt anchor unit B, is attached to the inner surface of a pillar of the vehicle as shown in FIG. 2, and then the shoulder belt anchor unit B in a complete assembly with the front cover 20b as shown in FIG. 2 is moved to the right from a position shown in FIG. 2 toward the stud bolt 6, so that the ring 74 fits over the stud bolt 6. As the shoulder belt anchor unit B is advanced further, the edges of the semicircular recesses 56 (FIG. 16) come into contact with the cam surface 6b formed on the extremity of the head of the stud bolt 6. As the shoulder belt anchor unit B is advanced further, the edges of the semicircular recesses 56 of the latch members 55 are forced to move radially outward by the cam surface 6b, so that the latch members 55 are moved away gradually from each other against the resilience of the torsion coil springs 60. In a state where the latch members 55 have reached the largest diameter portion of the cam surface 6b, the latch members 55 are moved to positions shown in FIGS. 7 and 17, and the torsion coil springs 60 strained in a V-shape. When the latch members 55 are advanced slightly further along the cylindrical circumference of the stud bolt 6, the latch members 55 are caused to fall snappingly into the engagement groove 7 by the resilience of the torsion coil springs 60. Thus, the shoulder belt anchor unit B can be joined to the adjusting unit A in an instant. When the shoulder belt anchor adjusting device is thus assembled, the periphery of the opening 22 of the inner anchor part 21a rests stably against the shoulder 8 of the stud bolt 6. Since the latch members 55 lie between the cushioning member 44 and the coating layer 24 formed over the surface of the inner anchor part 21a, which serve as a guide means, the latch members 55 will not rattle even if the same are shaken by vibrations generated by the vehicle.

Although the shoulder belt anchor adjusting device of the first embodiment described above is provided with the upper and the lower latch member 55, the shoulder belt anchor adjusting device may be provided with a single latch member. It goes without saying that the latch members may be disposed so as to be moved in horizontal directions perpendicular to the axis of the stud bolt 6. The holder 32 of the guide means for guiding the latch members may be omitted, and any suitable guide means other than that described herein may be employed, provided that the guide means is able to guide the latch members.

Figure 18:
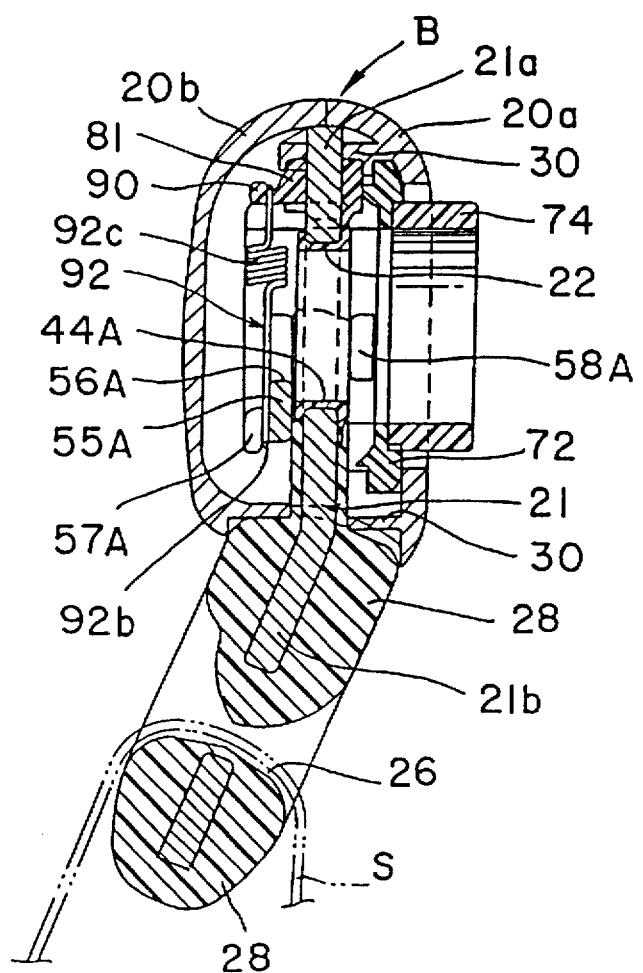
FIG. 18 is a longitudinal sectional view of a shoulder belt anchor unit included in a shoulder belt anchor adjusting device according to a second embodiment of the present invention.
Figure 19:
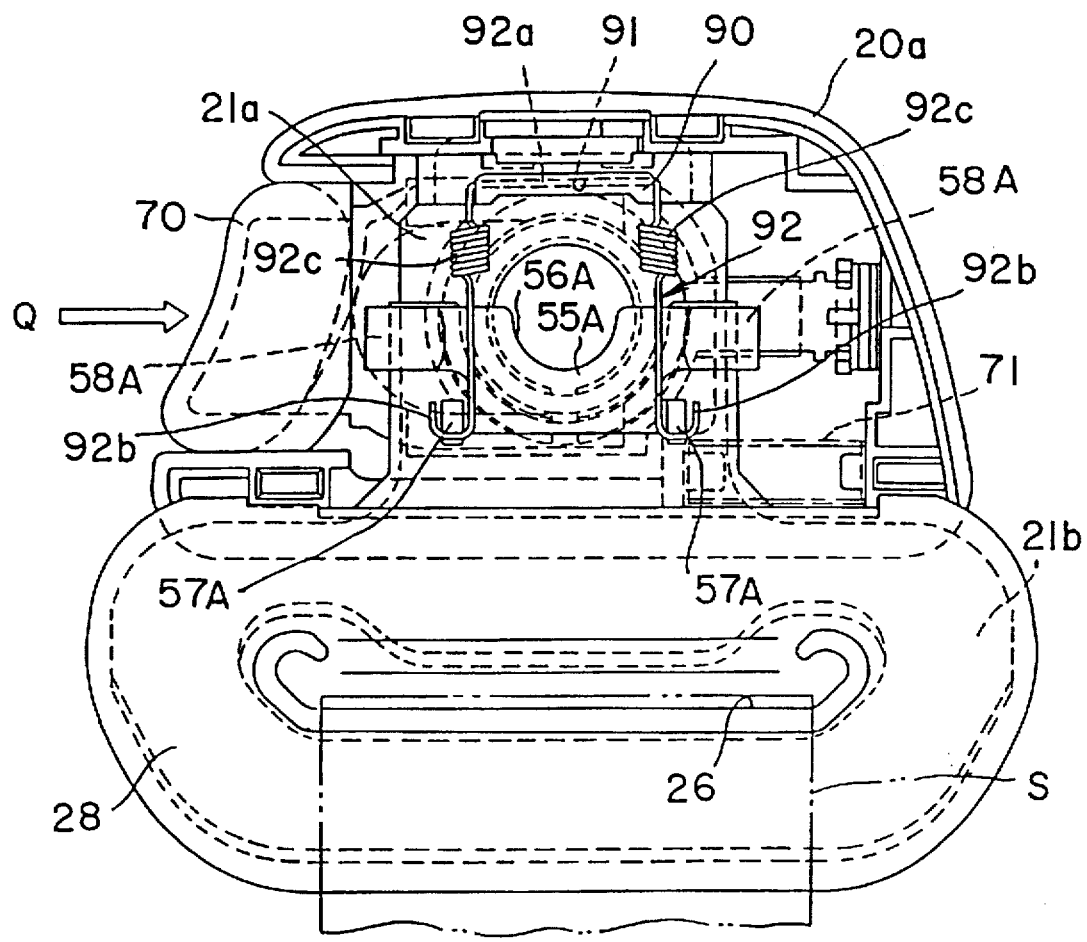
FIG. 19 is a front view of the shoulder belt anchor unit of FIG. 18 as viewed from the left in FIG. 18.

A shoulder belt anchor adjusting device of a second embodiment according to the present invention provided with a single latch member and not provided with any part corresponding to the holder 32 is shown in FIGS. 18 and 19, in which parts like or corresponding to those of the first embodiment are designated by the same reference characters and the description thereof will be omitted.

Figure 20:
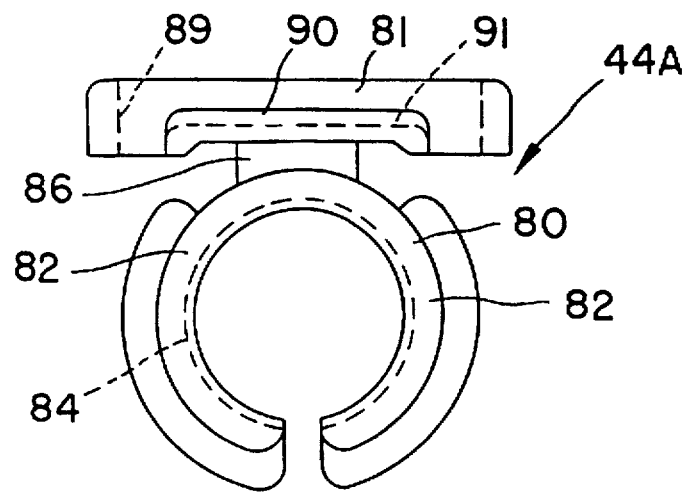
FIG. 20 is a front view of a cushioning member employed in the shoulder belt anchor unit of FIG. 18.
Figure 21:
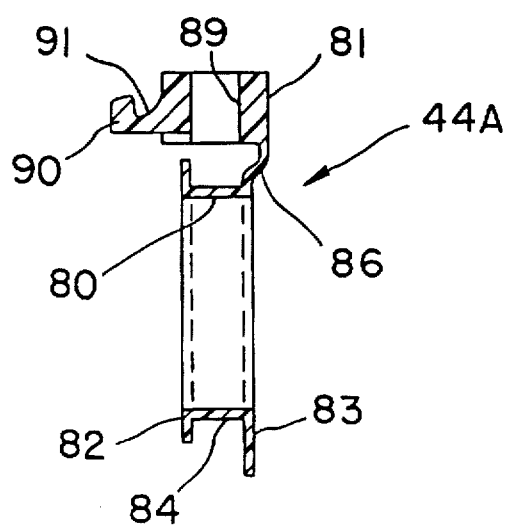
FIG. 21 is a sectional side view of the cushioning member of FIG. 20.
Figure 22:
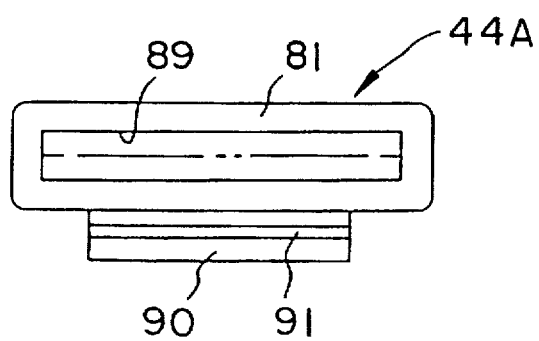
FIG. 22 is a top view of the cushioning member of FIG. 20.

Referring to FIGS. 18 and 19, the shoulder belt anchor adjusting device of the second embodiment is provided with a single latch member 55A having a semicircular recess 56A similar to the semicircular recesses 56 of the latch members 55 employed in the first embodiment. The latch member 55A is provided on the front surface of the inner anchor part 21a located in the space defined by the covers 20a and 20b. The latch member 55A is provided integrally with a pair of projections 57A at the opposite side ends of the lower portion of the front surface thereof. FIGS. 20, 21 and 22 show a cushioning member 44A corresponding in function to the cushioning member 44 of the first embodiment. The cushioning member 44A is formed of a soft synthetic resin, such as a polyacetal resin and has, in an integral piece, a cylindrical part 80 to cover the side surface of the central opening 22 of the inner anchor part 21a and its vicinity, a support part 81 and a connecting part 86 connecting the support part 81 to an upper portion of the cylindrical part 80. The cylindrical part 80 is provided with flanges 82 and 83 on the front and the back end thereof, respectively. The flanges 82 and 83 define a circular groove 84 on the outer circumference of the cylindrical part 80. The support part 81 has a transversely elongate shape and is provided with a transversely elongate slot 89, and integrally with a support rib 90 provided with a spring bearing groove 91 in its upper surface. The lower portion of the cylindrical part 80 may be slit as shown in FIG. 20.

As shown in FIG. 18, the cushioning member 44A is fitted in the central opening 22 of the inner anchor part 21a so that the flange 82 thereof is in contact with the front surface of the inner anchor part 21a, whereby the side surface of the opening 22 and its periphery of the inner anchor part 21a are covered with the cushioning member 44A. Thus, the cushioning member 44A has the same cushioning function as that of the coating layer 24 of the first embodiment as well. As shown in FIG. 18, the support rib 90 formed on the front surface of the support part 81 of the cushioning member 44A protrudes to the front beyond the front surface of the inner anchor part 21a, and the upper portion of the inner anchor part 21a is inserted in the transversely elongate slot 89 of the support part 81. The second embodiment does not need any part corresponding to the holder 32 of the first embodiment, the number of the component parts of the second embodiment is smaller than that of the first embodiment, and the second embodiment has a simple construction.

When the shoulder belt anchor adjusting device is assembled, a pair of hooks 92b formed by curving the lower ends of a pair of legs of a spring 92 having the shape of inverted letter U are hooked on the pair of projections 57A of the latch member 55A as best shown in FIG. 19, and the upper portion (a portion forming the bottom of the inverted letter U) 92a is hooked on the support rib 90. Coil springs 92c are formed in the pair of legs of the spring 92 to apply an upward force to the projections 57A of the latch member 55A so that the latch member 55A is held at an upper position shown in FIGS. 18 and 19. The latch member 55A is integrally provided with a pair of U-shaped projections 58A, similar to the pair of U-shaped projections 58 of the latch member 55 shown in FIG. 15, protruding to the back. The U-shaped projections 58A extend around the opposite side edges of the inner anchor part 21a and engage with the back surface of the inner anchor part 21a, respectively. The latch member 55A slides vertically along the surfaces of the inner anchor part 21a.

The second embodiment is entirely the same in operation as the first embodiment. In the second embodiment, the latch member 55A disposed under the stud bolt 6 is lowered gradually by the cam surface 6b formed on the head of the stud bolt 6 when the shoulder belt anchor unit B is pushed against the adjusting unit A along the axis of the stud bolt 6 and, finally, the latch member 55A snaps to fall into the engagement groove 7 to hold the shoulder belt anchor unit B in place on the adjusting unit A.

Although the invention has been described in its preferred forms with a certain degree of particularity, obviously many changes and variations are possible therein. It is therefore to be understood that the present invention may be practiced otherwise than those specifically described herein without departing from the scope and spirit thereof.

What is claimed is:

1. A shoulder belt anchor adjusting device comprising:
   an adjusting unit supported on a side pillar of a vehicle to be movable in substantially vertical directions along the side pillar, and having a shoulder belt anchor support projection projecting into a cabin of the vehicle, said shoulder belt anchor support projection being provided with first engagement means;

a shoulder belt anchor unit detachably mounted on said support projection of the adjusting unit, and having an anchor member through which a seat belt is passed, said shoulder belt anchor unit being provided therein with second engagement means engageable with the first engagement means in a spring action when the shoulder belt anchor unit is moved to the adjusting unit along an axis of said support projection;

said shoulder belt anchor unit having cover means enclosing therein a part of said anchor member, said part of the anchor member having an opening for receiving said support projection of the adjusting unit; and a holder secured to said part of the anchor member and having a flat main part disposed in a spaced opposite relation to said part of the anchor member, said flat main part having a through hole coaxial with said opening of the anchor member, said anchor member and said flat main part of the holder defining therebetween a guide space receiving said second engagement means therein.

2. A shoulder belt anchor adjusting device according to claim 1, wherein the first engagement means of the shoulder belt anchor support projection comprises an engagement groove formed in a circumference of said support projection, and said second engagement means comprises latch means disposed within the shoulder belt anchor unit and elastically biased in a latching direction so as to engage with the engagement groove, and wherein said support projection is provided at an extremity of a head thereof with a cam surface for engaging with the latch means to move the latch means in a releasing direction, against resilience means elastically biasing the latch means in the latching direction, when the shoulder belt anchor unit is moved toward the adjusting unit along the axis of said support projection.

3. A shoulder belt anchor adjusting device according to claim 2, wherein said latch means comprises a pair of opposite latch members elastically biased against each other so as to be brought in abutting contact with each other along opposite edges thereof, said edges having opposite recesses, respectively, which combinedly form an opening into which said support projection of the adjusting unit is passed when the shoulder belt anchor unit is moved to the adjusting unit.

4. A shoulder belt anchor adjusting device according to claim 2, wherein said latch means comprises a single latch member elastically biased for engagement with said engagement groove.

5. A shoulder belt anchor adjusting device according to claim 2, wherein the shoulder belt anchor unit is internally provided with guide means for guiding the latch means, and a surface of the guide means is formed of a cushioning material.

6. A shoulder belt anchor adjusting device according to claim 1, wherein said second engagement means comprises latch means movable in said guide space and elastically biased for engagement with said first engagement means.

7. A shoulder belt anchor adjusting device according to claim 6, further comprising cushioning means provided on said holder for contact with said latch means.

8. A shoulder belt anchor adjusting device according to claim 6, further comprising coating means made of a cushioning material and applied on said part of the anchor member.

9. A shoulder belt anchor adjusting device according to claim 1, further comprising cushioning means on said part of the anchor member, including said opening thereof.

10. A shoulder belt anchor adjusting device according to claim 9, wherein said second engagement means comprises latch means supported on said part of the anchor member through said cushioning means for latching movement with said first engagement means.

* * * * *